United States Patent
Farhadiroushan et al.

(10) Patent No.: US 7,865,044 B2
(45) Date of Patent: Jan. 4, 2011

(54) SENSING SYSTEM USING OPTICAL FIBER SUITED TO HIGH TEMPERATURES

(75) Inventors: Mahmoud Farhadiroushan, Stanmore (GB); Tom Richard Parker, London (GB); Michail Mondanos, Rhodes (GB)

(73) Assignee: Sensornet Limited, Elstree (GB)

( * ) Notice: Subject to any disclaimer, the term of this patent is extended or adjusted under 35 U.S.C. 154(b) by 0 days.

(21) Appl. No.: 12/094,647

(22) PCT Filed: Dec. 6, 2006

(86) PCT No.: PCT/GB2006/050432
§ 371 (c)(1),
(2), (4) Date: May 22, 2008

(87) PCT Pub. No.: WO2007/066146
PCT Pub. Date: Jun. 14, 2007

(65) Prior Publication Data
US 2008/0273852 A1    Nov. 6, 2008

(30) Foreign Application Priority Data
Dec. 6, 2005    (GB) .................................. 0524838.0

(51) Int. Cl.
*G02B 6/00*    (2006.01)
(52) U.S. Cl. .......................................... 385/12
(58) Field of Classification Search .................. 385/12, 385/13
See application file for complete search history.

(56) References Cited

U.S. PATENT DOCUMENTS

| | | | |
|---|---|---|---|
| 4,407,561 A | 10/1983 | Wysocki | |
| 4,418,984 A | 12/1983 | Wysocki et al. | |
| 4,750,806 A | 6/1988 | Biswas | |
| 4,893,895 A | 1/1990 | Berthold et al. | |
| 5,096,671 A * | 3/1992 | Kane et al. ................ | 422/82.07 |
| 5,290,103 A * | 3/1994 | Fevrier et al. ................ | 374/131 |
| 6,204,920 B1 * | 3/2001 | Ellerbrock et al. .......... | 356/477 |
| 6,511,222 B1 * | 1/2003 | Bouamra .................... | 374/161 |
| 6,966,384 B2 | 11/2005 | Griffiths | |
| 7,355,163 B2 | 4/2008 | Watley et al. | |
| 2006/0115204 A1 * | 6/2006 | Marsh et al. .................. | 385/12 |
| 2006/0153508 A1 | 7/2006 | Bowker et al. | |
| 2006/0210269 A1 | 9/2006 | Farhadiroushan et al. | |

FOREIGN PATENT DOCUMENTS

| | | |
|---|---|---|
| JP | 08194140 A | 7/1996 |
| WO | 2006003477 A2 | 1/2006 |

\* cited by examiner

*Primary Examiner*—Charlie Peng
(74) *Attorney, Agent, or Firm*—Barkume & Associates, P.C.

(57) ABSTRACT

Remote sensing in an environment having temperatures greater than 300° C., using an optical fiber having a core (10), a cladding (20), and a metallic protective coating (30) on the cladding to protect a surface of the cladding, the cladding having a diameter greater than 150 μm, and a thickness of at least 50 μm. The larger diameter cladding means stress from the metallic protective layer can be reduced, giving lower optical loss and better hydrogen protection. A metal conduit (330) encapsulates the sensing fiber, and a pump evacuates the conduit to reduce hydrogen seepage. Ceramic splice protectors are used. OTDR is used to determine differential loss at different locations along the fiber. A reflective element at the far-end of the fiber eases calibration.

6 Claims, 8 Drawing Sheets

FIG 1 PRIOR ART

Core
OD 50 microns

Cladding
OD 125 microns

Carbon Layer
Thickness 5 microns

Polyimide Layer
Thickness 20 microns

FIG 2

CORE 10
OD 50 microns

CLADDING 20
OD 200 microns

METALLIC LAYER 30
OD 235 MICRONS

PROTECTIVE LAYER 40

FIG 7
1st stage

FIG 8
2nd stage

Fiber 1

FIG 14

MIRROR 920

Fiber 2

FIG 15

Twin core fiber    TAPER

MIRROR 920

Tapered to introduce coupling between the cores and then the mirror couples the light back from one core to the other

OPTICAL PATH 1 ⟷

SENSING SYSTEM 100

REFLECTIVE ELEMENT 900

FIG 16

SENSING SYSTEM USING OPTICAL FIBER SUITED TO HIGH TEMPERATURES

RELATED APPLICATIONS

The present invention relates to previously filed cases entitled "Method and Apparatus for Generation and Transmission of High Energy Optical Pulses for Long Range Measurements", publication WO 2004/073172, (ref SENS 006), filed 11 Feb. 2004, "Direct Measurement of Brillouin Frequency in Distributed Optical Sensing Systems" Publication WO2005/1006396, (ref SENS 007) filed 22 Mar. 2005, and "Intervention Rod", PCT application no PCT/GB2005/050107, filed 7 Jul. 2005 (ref SENS 008), all incorporated herewith by reference in their entirety.

FIELD OF THE INVENTION

The present invention relates to sensing systems, methods of sensing, and optical fibers for sensing and suited to high temperature environments.

BACKGROUND

There is a requirement in industry for the measurement of conditions such as strain or temperature and other conditions at all points over long distances. Typical uses are for monitoring oil and gas wells, long cables and pipelines. The measurements can be displayed or analysed and used to infer the condition of the structures. Distributed temperature sensors (DTS) often use Raman or Brillouin components of scattered light in optical fibers as the means to determine the temperature. Here, light from an optical source is launched into a fiber and the small amount of light that is scattered back towards the source is analysed. By using pulsed light and measuring the returning signal as a function of time, the backscattered light can be correlated to distance along the fiber. This backscattered light contains a component which is elastically scattered (Rayleigh light) and components that are up- and down-shifted in frequency from the source light (Raman and Brillouin anti-Stokes and Stokes light respectively, also known as inelastic scattered light). The powers of the returning Raman components are temperature dependent and so analysis of these components yields the temperature. The powers and frequency of the returning Brillouin components are strain and temperature dependent and so analysis of both components can yield temperature and strain independently. Such systems have been known for many years.

A typical optical fiber is composed of a core within a layer of cladding and thereafter one or more buffer layers. The core provides a pathway for light. The cladding confines light to the core. The buffer layer provides mechanical and environmental protection for both core and cladding. A typical single-mode fiber (SMF) is composed of precision extruded glass having a cladding with a diameter of 125 μm+−2 μm and a core with a diameter of 8 μm+−1 μm at a centre of the cladding. The buffer layer is typically composed of a flexible polymer applied onto the outer surface of a cladding. Most commercial fibers are manufactured with a buffer layer of a polymer coating. With special polymer materials such as polyimide, these types of fiber can offer good performance up to 300° C. in normal atmosphere. However, above 300° C. and in high water or high content hydrogen environment, the performance of the optical fiber is significantly degraded due to deterioration of the coating and or ingress of hydrogen. It is known to use metallic coatings on fibers for higher operating temperatures and more resistance to hydrogen ingress. In this case the fiber is pulled through a pot of molten metal that has a melting point less than the fiber. A thick metallic coating is formed around the fiber as the metal solidifies. However, because of the difference in expansion coefficient of metal and fiber material, the metal coating exerts addition strain on the fiber that commonly results into higher optical losses. Another problem is the ability to produce long continuous length of the fiber due to the higher probability of weak points being induced in the fiber by the metallic coating, and limitations of the capacity of most common coating devices.

It is also known that fiber optic cables can deteriorate in harsh environments such as those encountered in down-hole fiber optic sensing applications. As discussed in U.S. Pat. No. 6,404,961, down-hole environmental conditions can include temperatures in excess of 130° C., hydrostatic pressures in excess of 1000 bar, vibration, corrosive chemistry and the presence of high partial pressures of hydrogen. The deleterious effects of hydrogen on the optical performance of optical fiber, particularly in sub-sea installations for the telecommunications industry, have long been documented. To protect optical fibers from the effects of hydrogen, hermetic coatings and barriers, such as carbon coatings and the like have been used to minimize the effects of hydrogen. However, such submerged environments are cold. At the elevated temperatures experienced in a harsh down-hole environment, such coatings lose their resistance to permeability by hydrogen. Additionally, at such high temperatures, the effects of hydrogen on an optical fiber may be accelerated and enhanced.

U.S. Pat. No. 6,404,961 suggests using a core including an inner stainless steel tube having one or more optical fibers contained therein, and a surrounding protective layer includes an outer stainless steel tube and a layer of buffer material such as teflon positioned between the outer tube and the inner tube, the buffer material maintaining the inner tube generally centrally located within the outer tube and providing a mechanical link between the inner tube and the outer tube to prevent relative movement therebetween. The inner steel tube may be coated with a low hydrogen permeability material such as carbon, to minimize the entrance of hydrogen. The carbon can be coated with a protective layer of polymer to protect against damage such as scratching of the carbon.

Another proposal is shown in WO2004066000. This explains that since the optical fiber itself is relatively delicate, special care must be taken to protect it as it is being placed in the well bore and during normal operation of the well. One known method is to install a small hollow metal tube, sometimes referred to as a capillary tube or instrumentation tube, having an outside diameter of approximately ¼ inch, down the well as it is being completed. Such tubes are also typically installed in well bores for other purposes, such as chemical injection. The fiber optic cable is typically comprised of a glass or plastic fiber core, one or more buffer layers, and a protective sheath. The optical fiber is typically a single optical fiber strand, coated with a thin layer of a protective material, typically composed of a heat polymerized organic resin. This may be impregnated with reinforcing fibers for installation in well bores where the operating temperatures may reach 250° C. The fiber optic cable may need to be installed at lengths of up to 40,000 feet. State-of-the-art apparatus for installing such fiber optic cable typically include means for pulling the cable from a cable reel, propelling the cable by means of tractor gears, or a capstan, and in some cases, impelling the cable through the duct by means of fluid drag. Following completion of the well, an optical sensing fiber is installed inside the instrumentation or capillary tubing by pumping a fluid down the tubing and using the velocity of the fluid to drag the fiber down the tubing.

One advantage of this approach is the ability to replace a failed optical fiber, by pumping it out and re-pumping in a new one without interrupting the normal operation of the well. However, the fluids used to pump the fiber down the instrumentation or capillary tube may be harmful to the optical fiber and lead to failure of the optical fiber over time, especially at the elevated temperatures typically seen within a well bore. Although pumping the fiber out of the well, and deploying a new fiber is possible, as described above, the procedure is time consuming and expensive even though the well continues to operate during the removal and re-deployment of the fiber. Also, there is the risk that the replacement operation is not successful.

Further, it is well known that any moisture (water) present in the instrumentation or capillary tube will also seriously attack the integrity of the optical fiber at elevated temperatures. In addition, hydrogen gas, normally found in many oil and gas wells, tends to seep into the instrumentation or capillary tubing over time. The hydrogen gas is absorbed by the optical fiber, causing the fiber to darken. The end result of the above described processes is that the optical fiber fails regularly when subjected to high temperatures within the well bore, sometimes in a matter of days, and has to be replaced.

WO2004066000 proposes a flexible protective barrier around the core and cladding of the optical fiber, the protective barrier being sufficiently flexible to allow storage of the fiber assembly in a spooled condition, and having an outer diameter sized to easily fit within an instrumentation or capillary tubing through which the fiber assembly is pumped down into a well bore. The protective barrier can be thin tubing formed from nickel or stainless steels, or other materials that prevent the transmission of deteriorating substances into the fiber. The protective tubing may include a hydrogen scavenging material coating on the inside or outer side of the tubing. The tubing that encases the optical fiber protects the fiber during deployment and during actual operation, and is significantly more robust than bare fiber, having a breaking strength more than 10 times that of a typical optical fiber. Moreover, the fiber inside the tubing is not exposed to the injection fluids used to pump it down the instrumentation tubing, minimizing exposure to injection fluids as a source of fiber degradation. Further, since the tubing encasing the fiber can be hermetically sealed, moisture can be kept away from the fiber, thus eliminating another major source of optical fiber failure. Alternatively, the fiber tubing can be filled with an inert gas such as nitrogen.

One particularly harsh environment is bore holes used for high temperature steam recovery, namely Steam Assisted Gravity Drainage (SAGD) and Cyclic Steam Stimulation (CSS) as is becoming widely used for oil recovery in Canada. In order to fully understand and optimise recovery, real-time monitoring has become an integral part of the SAGD and CSS processes. The monitoring measures temperature and pressure using fiber optic Distributed Temperature Sensors (DTS) which have the ability to take measurements every 1 m with a resolution of better than 0.01° C. At present the method of installation for the fiber optics is to install a ¼" control line inside the well and to "pump" the fibers into the control lines. The outer protective coating of the fibers has been a combination of polyimide and carbon coated fibers which are rated by the manufacturers to 300° C. under lab conditions. However, in practice the fibers often fail at much lower temperatures (below 200° C.). Fiber darkening, leading to the total loss of signal, has been seen to occur much sooner than expected, over periods ranging from hours to months.

For accurate distributed sensing it is important to be able to account for variations of the optical fiber properties and correct for any changes that can result in a measurement error. For distributed temperature sensing, if no appropriate calibration is made, the variation of differential loss between the Stokes and anti-Stokes results in a temperature error in the computed temperature along the fiber. Also, if the loss is very high, as has been observed in some wells, it is not possible for a usable amount of light to pass down the fiber, making it impossible to take any measurement.

SUMMARY OF THE INVENTION

It is an object of the present invention to provide improved apparatus and methods. According the first aspect of the invention there is provided:

A system for remote sensing in an environment having temperatures greater than 300° C. the system having a sensing cable comprising an optical fiber having a core, a cladding, and a metallic protective coating on the cladding to protect a surface of the cladding, the cladding having a diameter greater than 150 µm, and a thickness of at least 50 µm.

By using a larger diameter cladding than usual, the effects of stress from the metallic protective layer can be reduced. By reducing the stress, lower optical loss can be achieved because the modal stress perturbations can be reduced. This means sensing measurements can be more accurate, and useful life of the fiber can be increased. This is particularly valuable for applications such as bore holes where it can be extremely expensive to replace the fiber. Furthermore, lower stress can result in a better yield during manufacturing and thus lead to longer continuous lengths and thus less need for fiber splices which are expensive and vulnerable to damage. The increased diameter can also impede the effect of any metal or gas diffusion reaching interacting with the light propagating in the core of the fiber and thus lead to longer useful life. It can also facilitate accommodating multiple cores within the same fiber.

An additional feature of some embodiments is the metallic coating having any one or more layers of: Au, Ag, Al, Cu, Cr or an alloy of these metals.

These are particularly suitable for protecting the fiber and may form a bond to the cladding, or an unbonded coating around the fiber. An intervening bonding underlayer can be used to help bond the metallic coating to the fiber.

An additional feature of some embodiments is the metallic coating having Au of a thickness of 20-50 µm. This can provide particularly good protection at higher temperatures, >400° C.

An additional feature of some embodiments is an outer layer on the metallic coating, the outer layer having at least one of: an oxide layer of the metallic coating, another metallic layer having its own oxide layer, and a polymer layer.

This can help to protect the metallic layer from physical damage such as scratching during installation, and thus prevent optical loss or fiber failure at that point. It can also help prevent hydrogen contact with the metallic coating, which can otherwise cause dissociation and thus more hydrogen damage. For example in the case of Al, it forms a stable oxide layer on its surface. In the case of the gold, it would not form an oxide, and so another metallic layer or a polymer layer can be used to protect the surface of the gold and reduce the contact with hydrogen and avoid the increased hydrogen diffusion.

An additional feature of some embodiments is the sensing cable having a first conduit encapsulating the metallic coated sensing fiber.

This can help provide additional physical protection and may provide additional hydrogen ingress protection, mechanical strength and or corrosion resistance properties.

An additional feature of some embodiments is apparatus for evacuating or pumping fluid in the first conduit.

This can be useful to reduce a build up of hydrogen in the conduit and so can reduce hydrogen ingress. The fluid can comprise an inert gas for example or can help to remove any residual manufacturing or lubricating oil which can give out hydrogen at elevated temperatures.

An additional feature of some embodiments is a second conduit coupled to a far end of the first conduit to permit flow and return of the fluid.

This return path enables controlled circulation which can be more reliable than relying on uncontrolled outflow or inflow at a far end of the first conduit. The second conduit can be concentric or otherwise, and can help provide further mechanical protection. The optical fiber may be encapsulated with a first inner conduit and a second outer conduit where an inert gas such as nitrogen is passed through the inner conduit and then returned through the outer conduit. Alternatively a return path conduit that is hydraulically connected to the inner and or outer conduit may be used to circulate a fluid around the outer surface of the fiber and or the inner conduit.

An additional feature of some embodiments is a second conduit surrounding the first conduit, and a pump arranged to evacuate both the interior of the first conduit and the space between the first and second conduits.

This enables much of the hydrogen seepage to be removed before it can reach the fiber.

An additional feature of some embodiments is the first conduit being pre installed in a sensing location, the coated sensing fiber being sufficiently flexible for coiling before inserting into the pre installed first conduit, and the system having installing apparatus arranged to insert the coated sensing fiber by any of: pushing, pulling, injecting and propelling.

This enables the first conduit to be installed more permanently, and avoids the costs of extracting the conduit if the sensing fiber needs to be extracted. Friction reducing coatings can be used on the coated fiber and/or and inside of the first conduit to ease installation and reduce tensile or compressive forces on the fiber.

An additional feature of some embodiments is the second conduit being pre installed in a sensing location, the sensing cable having the first conduit being sufficiently flexible for coiling before inserting into the pre installed second conduit, and the system having installing apparatus arranged to insert the sensing cable by any of: pushing, pulling, injecting and propelling.

This enables the first conduit to protect the metallic coated fiber from damage during insertion. Friction reducing coatings can be used on either or both of the facing surfaces of the conduits to ease installation and reduce tensile or compressive forces on the fiber.

Another aspect of the invention provides a method of remote sensing using a sensing cable having an optical fiber having a core, a cladding, and a metallic protective coating on the cladding to protect a surface of the cladding, the cladding having a diameter greater than 150 μm, and a thickness of at least 50 μm, having the step of inserting the sensing cable into a pre installed conduit at a sensing location by any of: pushing, pulling, injecting and propelling, and the step of using the optical fiber to sense the conditions.

Such an optical fiber with a suitable (or large enough) diameter and with at least one metallic coating helps enable the effects of metallic stress and or creep to be significantly reduced, as discussed above. By inserting into a pre installed conduit, the insertion and extraction costs can be kept low, and risks of fiber damage during installation or in operation can be reduced. This is particularly valuable for high temperature sensing installations where such damage will shorten fiber life. An outer layer may be applied to the surface of the metallic coated optical fiber to provide a low friction surface contact for easier insertion inside the conduit. The coated fiber can be manufactured into a metal conduit to provide further protection during insertion.

A second aspect of the invention provides a system for remote sensing and having a sensing cable comprising an optical fiber having a core, and a cladding, and a first conduit encapsulating the sensing fiber, the system also having a pump for evacuating the first conduit.

This can be useful to reduce a build up of hydrogen in the conduit and so can reduce hydrogen ingress.

An additional feature of some embodiments is a second conduit surrounding the first conduit, and the pump being arranged to evacuate both the interior of the first conduit and the space between the first and second conduits.

This enables more of the hydrogen seepage to be removed before it can reach the fiber.

An additional feature of some embodiments is the metallic coated optical fiber having at least one high temperature fiber splice having a ceramic protector suitable for protecting the splice from temperatures greater than 300° C.

Another aspect of the invention provides an optical fiber having at least one metallic coating and at least one high temperature fiber splice having a ceramic protector suitable for protecting the splice from temperatures greater than 300° C.

An additional feature of some embodiments is the metallic coating extending continuously over the ceramic protector.

An additional feature of some embodiments is the ceramic protector having a thermal expansion coefficient matched to any of: the fiber, the metallic coating and a value between the expansion coefficients of the fiber and the metallic coating.

According to another aspect there is provided:

A sensing system having a sensing optical fiber, and a receiver arranged to receive signals from the sensing optical fiber and determine conditions from the signals, a fiber loss detector arranged to use OTDR to determine differential loss at different locations along fiber using lasers of wavelength corresponding to Stokes and anti Stokes components and derive a profile of differential loss along the fiber, a spectrum of the lasers being matched to a spectrum of the stokes and anti stokes components received.

This can help enable more accurate determination of fiber differential loss profile which can then be used to correct sensing results obtained using full bandwidth receiving. This can enable higher losses and less linear losses to be tolerated and so can prolong the useful life of the sensing fiber. It also enables single ended measurements and so can avoid the need for a return optical path, thus saving the cost of a second fiber, and a U-bend at the far end, and so is valuable for use on existing installed fibers. All these advantages become more pronounced when used in high temperature environments where optical losses and short fiber life are greater problems.

An additional feature of some embodiments is a laser controller arranged to scan the laser frequency to match the spectrum of the received components.

An additional feature of some embodiments is a band filter arranged to filter the received components to match a spectrum of the laser.

Alternatively, a broad band source or super-continuum source may be used to measure the overall loss transmission matched to the spectral response of the Stokes and anti-Stokes components and also through the same receiving detectors.

According to another aspect there is provided:

A sensing system for determining distributed characteristics of a fiber, the system having a transmitter arranged to transmit pulses of light along the fiber from a near end, a detector to measure scattered light and a reflective element at the far-end to allow light to be returned to the detector along a second optical path, the system being arranged to detect first scatter travelling towards the near end from any given point in the fiber, and to detect second scatter travelling towards the far end from the given point, and reflected back to the detector, and being arranged to determine the distributed characteristics from the detected first and second scatter for a number of points along the fiber.

By using a reflective element, the packaging costs, complexity, losses and risks of using a U-bend can be avoided or reduced. Also, the outside dimensions can be smaller than those of a U-bend, enabling installation in narrower conduits. More flexibility to use single or double fibers or twin core fibers can be obtained, and other components such as rotators can be incorporated more easily. Compared to calibration using different wavelength transmitters, the additional costs and complexities of the multiple wavelength transmitters can be avoided. The second scatter is also termed the "ghost image".

An additional feature of some embodiments is a single fiber core, the transmitter using this fiber core for the pulses, and the second optical path using the same fiber core.

This can enable a cost reduction compared to using two fibers or a multi-core fiber, which is particularly valuable for more expensive fibers suitable for high temperature environments. The fiber life is also increased since risk of fiber deterioration causing loss of sensing is reduced since there is half the length in the harsh environment.

An additional feature of some embodiments is the fiber having a cladding of diameter greater than 150 µm and a metallic coating on the cladding.

Other advantages will be apparent to those skilled in the art, especially in relation to other prior art not known to the inventors. Any of the additional features can be combined together and combined with any of the aspects, as would be apparent to those skilled in the art.

BRIEF DESCRIPTION OF THE DRAWINGS

Embodiments of the invention and how to put it into practice are described by way of example with reference to the accompanying drawings in which:—

DETAILED DESCRIPTION

FIGS. 1-5, Sensing Cables for High Temperature

Figure 1:
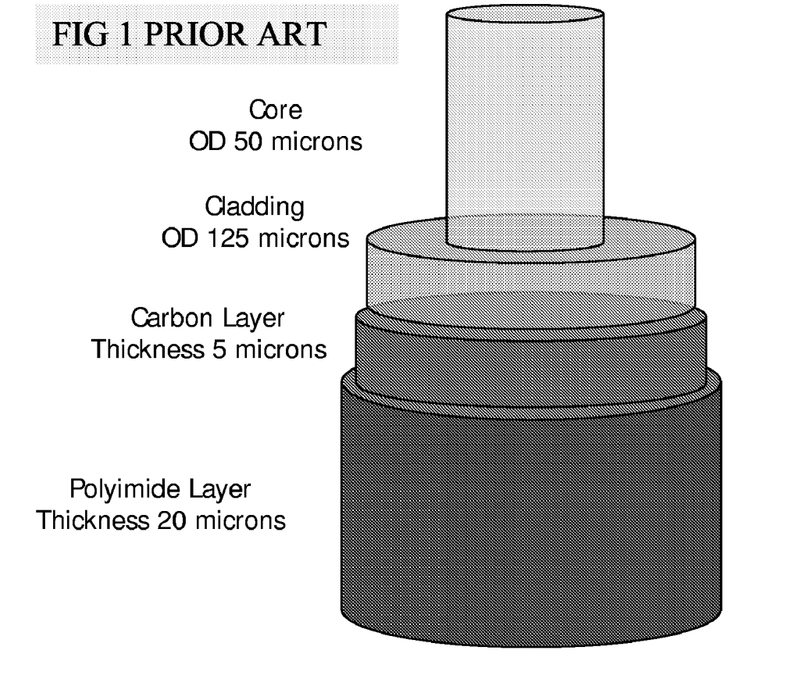
FIG. 1 shows a known sensing fiber.

By way of introduction to the embodiments, a known fiber will be described. FIG. 1 shows a typical known sensing fiber which has a core of 50 µm, a cladding of 125 µm, a protective layer of carbon, of thickness of 5 µm, and an outer protective layer of polyimide of thickness of 20 µm. This can be manufactured using established techniques.

High Temperature Fiber Factors

The coatings of FIG. 1 are typically rated to 300° C. under ideal conditions. However, it appears that once these fibers are installed inside oil wells, they are failing at temperatures lower than 200° C. This is believed to be due to a combination of two factors.

1. During the pumping installation technique the fiber coating is prone to damage which reduces the level of protection to the fiber. Even in low temperature applications, there has been extensive degradation. It should be noted that pumping requires a flexible, lightweight fiber and so, by necessity, the technique offers minimal fiber protection.

2. Hydrogen degradation. It has been discovered that in ¼" control lines hydrogen partial pressures of 1 psi are typical. Although the carbon coating is designed to provide a hermetic barrier against this hydrogen, it becomes ineffective at high temperatures or even at low temperatures if damaged. Once hydrogen penetrates the carbon coating, then it rapidly permeates the fiber, leading to darkening of the fiber. It now seems that carbon coating alone, even in good condition, does not provide an effective long-term hydrogen barrier at high temperatures.

It is quite possible that the hydrogen damage is extenuated by the pumping method itself. Depending on the fluid used, the pumping fluid may absorb atmospheric water and, with the many thousand of psi pressure used for the deployment, hydrogen may be forced into the fiber.

Figure 2:
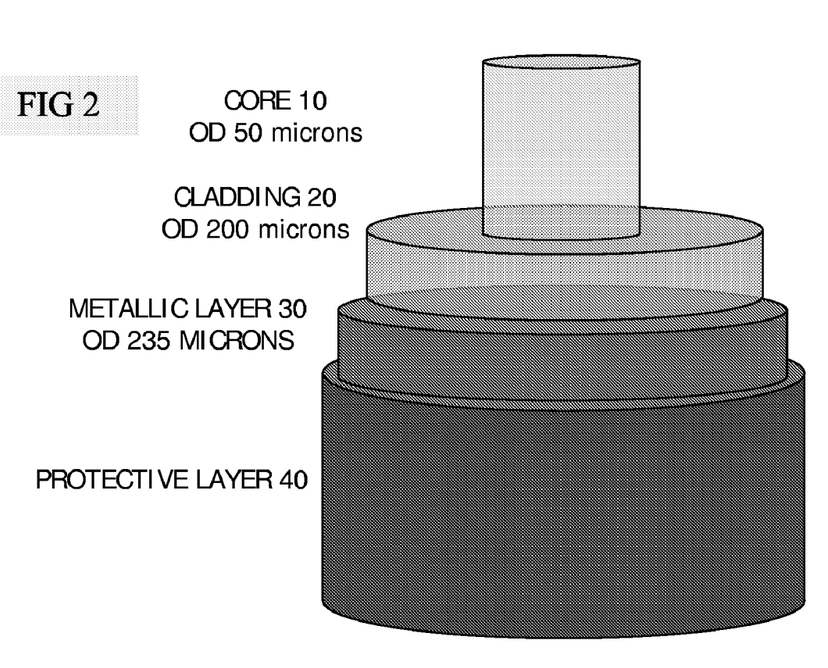
FIG. 2 shows a sensing fiber according to an embodiment.

FIG. 2 shows a first embodiment of a sensing fiber. In this case the core 10 is surrounded by a cladding 20 having a larger diameter, at least 150 µm and usefully in the range 180 µm to 250 µm, or 200 µm in the example shown. The core diameter is less important but should be not so large that the cladding becomes too thin, and susceptible to damage, so the cladding should be more than approximately 50 µm thick. The cladding has a metallic coating 30. This can be any of a number of metals or alloys. Examples that provide notable advantages include Au, Ag, Al, Cu, Cr or an alloy of these metals. This layer can protect the glass of the cladding from thermal deterioration. It can provide protection from hydrogen ingress as well or instead. The thickness of the metallic layer can be in the range approximately 5 µm to 55 µm, and in the example shown it is 35 µm, which can provide good performance for an Au coating. An outer protective layer 40 can optionally be provided to protect or insulate the metallic layer or provide additional protection to the fiber. This can be a polymer layer selected according to operating temperature for example. Or it can be an oxide layer such as Al oxide formed spontaneously and stable, on an Al metallic layer. Other layers can of course be added as desired, including an intervening bonding layer under the metallic layer, or further outer layers.

Some of the embodiments arise from a recognition that for sensing purposes, the useful life of the fiber in such environments depends on countering three major causes of deterioration: glass oxidation or other glass deterioration at high temperature, hydrogen ingress and physical damage during installation. The metallic coating can have a simultaneous effect on some or all of these in that the coating prevents exposure of the surface of the glass of the fiber to oxidation or other deterioration in such high temperatures. It also substantially prevents hydrogen ingress and also protects the glass from physical damage. Increasing the useful life can help reduce costs of replacing fibers in locations such as bore holes.

Some SAGD installations have temperatures above 250° C., and some CSS installations have temperatures above 360° C. At these elevated temperatures, metal-coated fibers are particularly useful and also offer a better hydrogen protection than carbon coatings.

Figure 3:
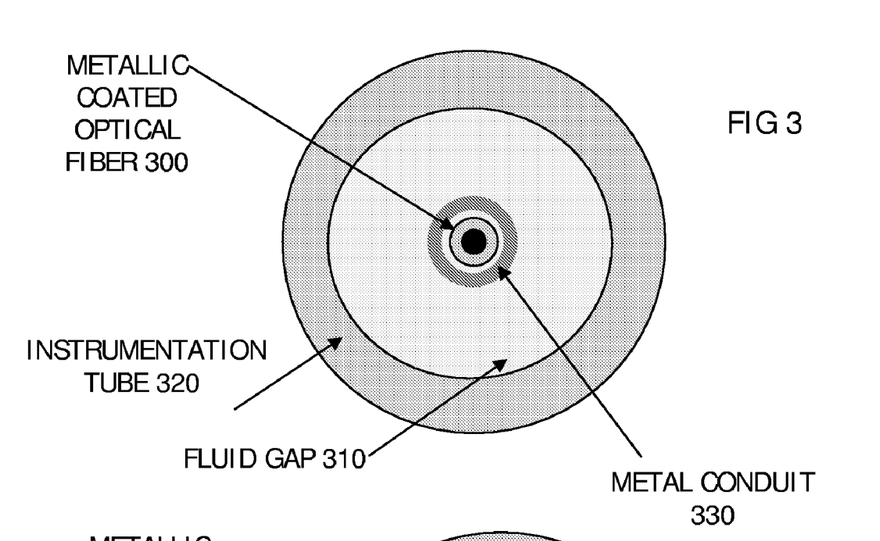
FIGS. 3 and 4 show cables for sensing according to embodiments.
Figure 4:
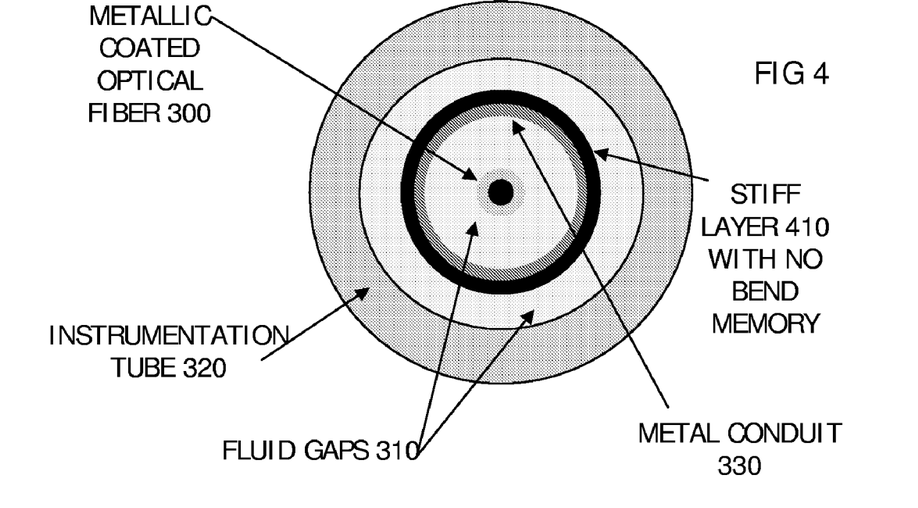

FIGS. 3 and 4 show examples of cables including sensing fibers. In the example of FIG. 3, a metal coated fiber 300 is surrounded by a first conduit in the form of metal conduit 330. This may be a stainless steel sheet wrapped around the fiber and welded. Another example is an Al tube, which can provide good hydrogen ingress resistance at high temperatures. It may have insulating and or hydrogen protective coatings on inside and/or outside surfaces of the conduit. This first conduit is contained within a second conduit in the form of instrumentation tube 320, which can be a ¼ inch diameter stainless steel tube for example. Optionally this can be pre installed in the sensing location such as a bore hole, and the sensing cable can be pushed or inserted into the pre installed second conduit. Optionally fluid can be pumped in the fluid gap 310 between the conduits.

FIG. 4 shows another embodiment, this time showing a gap between the metallic coated fiber and the first conduit. A second gap is provided between the first and second conduits. This provides two separate gaps along the sensing fiber and so if the gaps are coupled at a far end, a fluid can be circulated. In this example, a stiff layer 410 with substantially no bending memory is provided. This can make it easier to insert or propel the cable into the second conduit. Also this can provide an insulating layer between the conduits. The first conduit can be sufficiently flexible to enable spooling of the cable.

Some key features of the embodiments can include:
1. Cable design that contains barriers to prevent hydrogen ingress into optical fiber
2. Metal layers and metal coated fibers
3. Insulating layers: Hydrogen can penetrate metals in atomic form and not in molecular form. Atomic hydrogen may be generated through electrolysis process resulting from corrosion of the production tubing and the ¼" line that contains the fiber. To prevent this a protective insulating layer separates the metal barriers, an example is shown in FIG. 4. The insulating layers between different metal barriers can prevent direct metal to metal contacts.
4. A positive potential may optionally also be applied between the metal surfaces to attract away hydrogen ions or neutralise them.
5. The outer layer of insulating material may also provide a flexible overall structure with reduced or preferably no bending memory and smooth surface so that it can be injected inside a ¼" tube. This can provide longitudinal stiffness, and the lack of bending memory can help enable the assembly to be propelled into the tube and so avoid or reduce the need for pumping fluids, and thus reduce another source of hydrogen damage.

Another feature is a fluid filled gap between the first and second conduits. This can help avoid transfer of stresses to the fiber which could interfere with measurements. Also it can help reduce hydrogen damage because it can enable diffused hydrogen to be pumped out periodically. The fluid can comprise air or an inert gas such as nitrogen for example. The gap can be evacuated. Hydrogen getting materials can be located between the fiber and the conduits, with gas between the inner and outer tube. Other sequences can also be used.

To minimise installation damage, the installation technique can use a prior fixed conduit solution and so the fiber will be well-protected and will not experience the damage caused by pumping the fiber. There need be no fluids in contact with the fiber, which may otherwise be a cause of direct hydrogen absorption into the fiber.

Protective coatings and multi-layer protection can involve a metal coating on the fiber which offers a hermetic seal and can survive, and so protect, at higher temperatures than polyimide/carbon coatings. By housing the metal-coated fiber in a stainless steel inner conduit in the form of a capillary tube which, in turn, can be held inside a stainless steel ¼" tube, this multi-layer approach can better prevent the ingress of hydrogen into the fiber.

Hydrogen can only efficiently diffuse through metals in atomic (rather than molecular) form. Dissociation at a metal surface, at lower temperatures, usually occurs as part of a corrosion process. Atomic hydrogen can form on the surface of the ¼" tube and will rapidly diffuse and re-combine into molecular hydrogen in the annulus between the conduits, the outer ¼" tube and the inner capillary. There should be no corrosion process between the ¼" tube and the capillary and so less molecular hydrogen can dissociate and enter the capillary tube.

Any molecular hydrogen that does form in the annulus between the ¼" tube and the capillary still has the barrier of the capillary to pass. Thus the fiber should be in almost hydrogen-free atmosphere. Note also, even if small hydrogen levels appear in the capillary, it still has to dissociate and penetrate the metal coating and then the fiber.

For higher temperature operation such as above 500° C., or above 650° C., the hydrogen diffuses when in atomic form rather than molecular form, so it is preferable to stop the molecular hydrogen dissociating. By stopping a corrosion mechanism dissociation can be stopped. Although this will stop almost all dissociation at low temperatures, at elevated temperatures (greater than around 100° C.) hydrogen will spontaneously dissociate on metal surfaces without the need for a corrosion reaction. Different metals have different activation energies and, more importantly, dissimilar metals in contact can form an effective barrier: Once the hydrogen is in one metal then it may not have the energy to pass to another which may have a different activation energy. Cu/Mo multi-layers (only a few microns of each) can form a good barrier, even at high temperatures. As these layers may be expensive, it may be most efficient to deposit them on the fiber (less material). Oxide layers, such as the aluminium oxide that naturally forms on aluminium also form an effective hydrogen barrier.

In another embodiment, the protective barrier can be a coating which is impermeable to water vapor and fluids, and which is reactive with hydrogen gas to form molecules that cannot permeate into the fiber. Suitable coating materials may include carbon or other material known to getter hydrogen. The coating can be an alternative to a tube, or can be combined with a tube. The coating may consist of a non corrosive plating material applied to the metal coated fiber optic cable cladding material, encasing the core and cladding.

Another feature is a voltage source coupled to apply a potential difference between the first metallic hermetic layer and the second metallic hermetic layer after installation in the tube. This can serve to increase the barrier to hydrogen.

Figure 5:
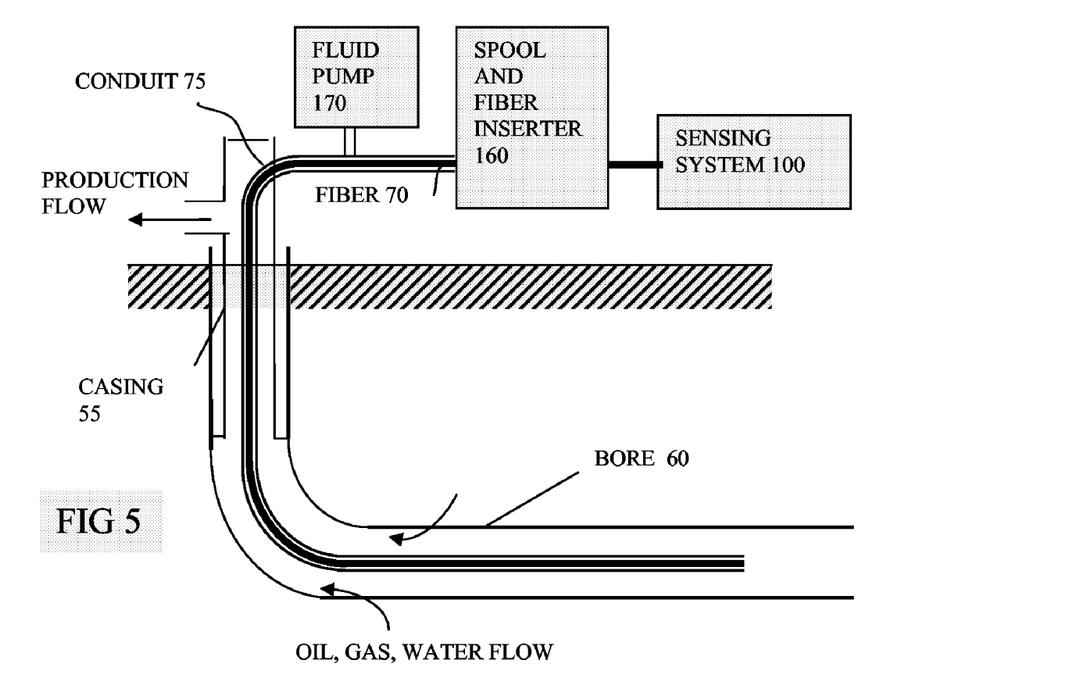
FIG. 5 shows an application of a sensing system according to an embodiment.

FIG. 5 shows an application of a sensing system for sensing conditions along a bore hole. The sensing fiber in the form of a fiber 70 (metal coated in some embodiments) is coupled to a system 100 at the wellhead on the surface (or seabed, or sea surface). The bore 60 is typically large enough to take a 10 inch steel casing 55 for a vertical part which can extend anything from hundreds to thousands of meters. The bore typically narrows to a 5 inch bore, 60 and is curved very gradually to extend horizontally for anything up to several thousand meters. Typically there are many boreholes serviced from a single wellhead location, each extending in different horizontal directions to cover a large area of the oil or gas field. At the wellhead, the production flow is typically fed away to one side through valves, and a removable cap suitable to resist high pressures is placed on the top, to enable vertical access into the wellbore for drilling tools or conventional intervention methods for example. The sensing system can be arranged to determine temperatures or other conditions such as pressure, in a distributed manner, anywhere along the bore. Flow rates and steam entry points can be deduced from temperature profiles and used to control and manage extraction. The stress at different points can be useful either for use in correcting temperature measurements, or for determining bending. The stress and temperature measurements can be made using established measurement principles which need not be described here in detail.

FIG. 5 also shows the sensing fiber is encapsulated in a conduit 75, which can be the first or second conduit. A fluid pump 170 is shown at the wellhead for evacuating or circulating fluid in the conduit. A spool and fiber inserter 160 is also shown at the well head for inserting or removing the fiber from the conduit. Clearly many other applications are conceivable.

The fluid pump can be in the form of a vacuum pump arranged to evacuate the conduit or both inner and outer conduits where there are two. The vacuum pump can be attached to the top of the cable and would pump out any gas or liquid in the spaces around the fiber. This can offer protection from hydrogen ingress either combined with other measures such as the metal coating of the fiber, or instead of such measures. Pumping both conduits is preferred as it is impossible to pump all the hydrogen out (as new hydrogen is always seeping in and the pumping rate from a long, thin tube is very low) but the vacuum pump can remove (say) 99.9% of the hydrogen in the outer tube then only a tiny part will get to the inner tube, and of that, the pump can again pump out (say) 99.9%. In this arrangement, the conduits need not be connected at the bottom and there is no requirement for circulation. The pumping efficiency increases significantly with the size of the pathway so large tubes, and large gaps between tubes are preferred.

Figure 6:
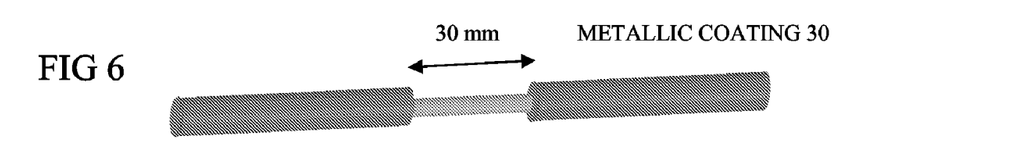
FIGS. 6, 7 and 8 show steps in making a fiber splice according to an embodiment.
Figure 7:
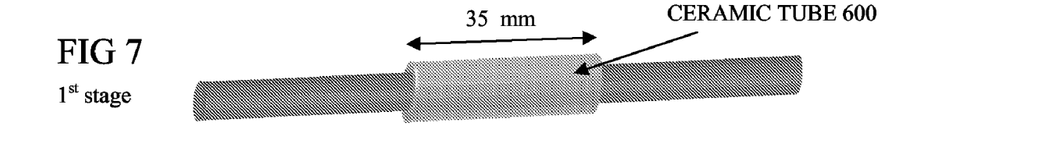
Figure 8:
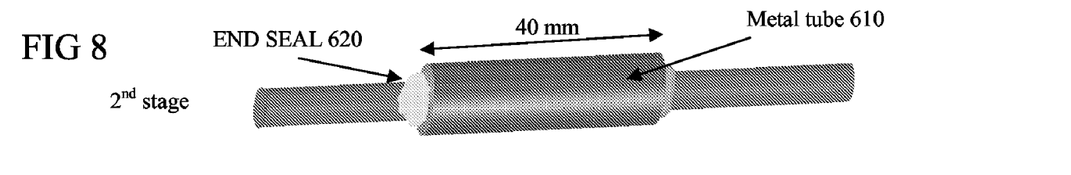

FIGS. 6-8, Fiber Splices for High Temperature

Splices are best avoided as they are usually add loss and risks of failure. However, for metallic coated fibers in particular, it may be cost effective to use splices since in some cases it is hard or expensive to produce sufficiently long lengths of fiber. For example, for gold coated fibers yield drops rapidly when producing lengths greater than several hundred metres, and the cost of the coated fibers is sufficient that it becomes economic to use splicing to achieve longer reaches.

A high-quality fusion splice is measured by two parameters:
i. Splice loss and
ii. Tensile strength For graded-index multimode fibers, the fiber related factors include core diameter mismatch, numerical aperture (NA) mismatch, index profile mismatch, core/cladding concentricity error and cladding diameter mismatch. Splice process-related, factors are those induced by the splicing methods and procedures. Splice process factors include lateral and angular misalignment, contamination and core deformation. Fiber preparation includes fiber stripping, surface cleaning and fiber-end angle.

FIGS. 6, 7 and 8 show steps in preparing a high temperature fiber splice according to an embodiment. A first step is to remove an outer protective coating and the metallic coating to leave the cladding exposed at the ends to be joined. This can be done by chemical or thermal treatment. Then the ends are cleaved, aligned and fused, and the result is shown in FIG. 6. Conventional fusion equipment can be used. In order to keep bubble splices to a minimum some fusion parameters can be optimised to accommodate a larger cladding diameter of the fiber (200 μm). For example prefusion can be extended and arc power can be increased. The uncoated gap of approximately 30 mm length is now covered by a protective tube which needs to be carefully matched to the metal coating and or the cladding, or matched to some point between these coefficients, to avoid introducing stresses which at high operating temperatures will reduce fiber life or affect sensing readings.

An example of a suitable protection for the protection of the fusion splice involves a two stage process. Initially an alumina ceramic tube and optionally a stainless steel tube are inserted over the gold fiber prior to splicing. The ceramic tube is moved to cover the splice as shown in FIG. 7, and attached to the gold coating on the fibers at each side of the splice using a seal 630 in the form of a thin layer air set ceramic cement. The cement cures at room temperature over an 18-24 hours period. The optional steel tube is passed over the ceramic tube as shown in FIG. 8 and attached to the gold fiber and ceramic tube using a seal 630 in the form of a magnesium oxide chemical set paste with good metal to metal and metal to ceramic bonding properties. This ceramic paste cures at room temperature over a four hour period. These materials are water based and do not outgas after curing. Their cure time can be accelerated by low temperature oven dry. Their maximum service temperature exceeds 1400° C. Another alternative seal is to use the same metal of the metallic coating, for example Au, in molten form to fill the gap and act as a seal to seal the ends of the tube and fix the tube in place. The end splice protector has a length of approximately 40 mm. For a coated fiber having 235 μm outside diameter, the ceramic tube can have an inside diameter of approximately 0.5 mm, and outside diameter of 0.8 mm. The steel tube can have an outside diameter of 1.1 mm.

The inner ceramic tubing is used to locate the fiber central to the outer steel tubing and to relieve some of the stresses caused by mismatching of the thermal expansion coefficients between the glass fiber and outer steel strengthening tube. An alternative is to use a thicker (for extra strength) ceramic with thermal expansion and conductivity closer to the glassy fiber. This will also reduce the curing and fabrication times. The metallic coating can now be extended over the ends of the protective tube and optionally over the entire tube to seal the splice.

Figure 9:
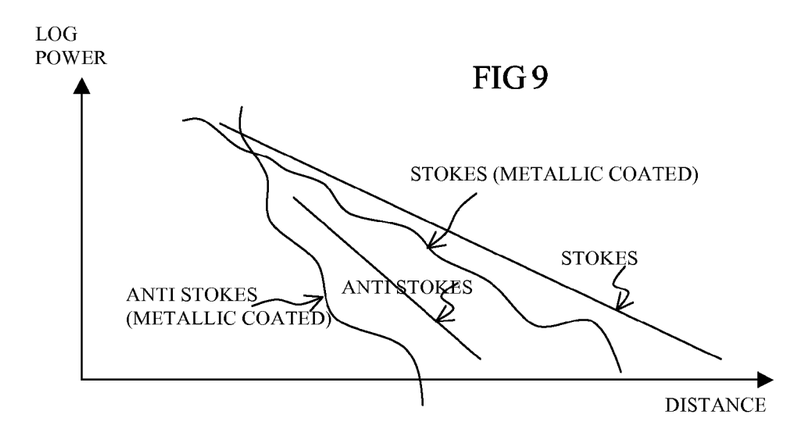
FIG. 9 shows an application of a loss testing system according to an embodiment.
Figure 10:
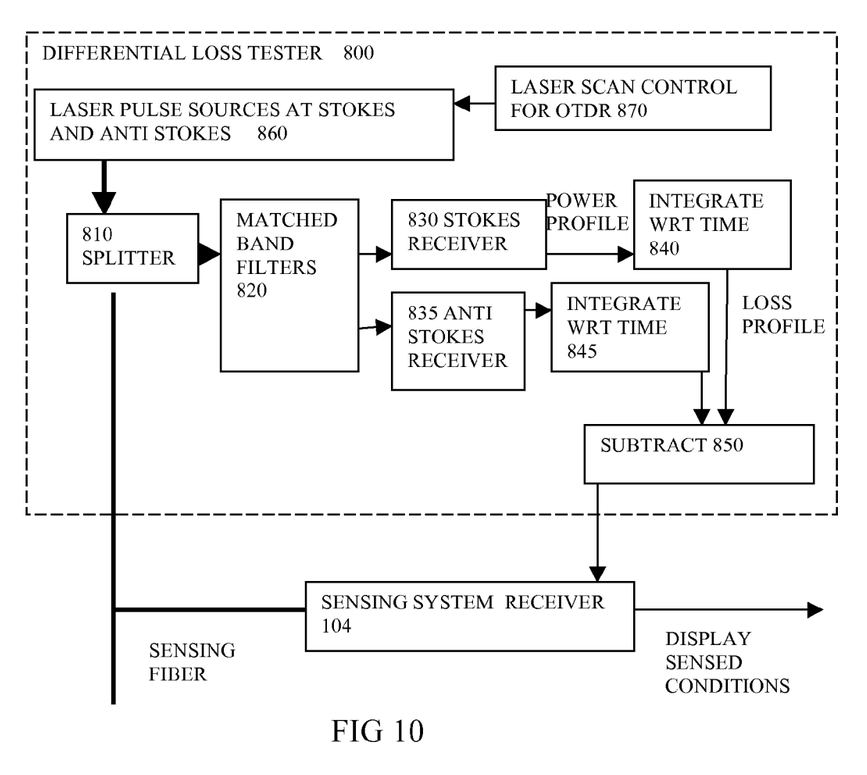
FIG. 10 shows a graph of backscatter v distance along a sensing fiber.
Figure 11:
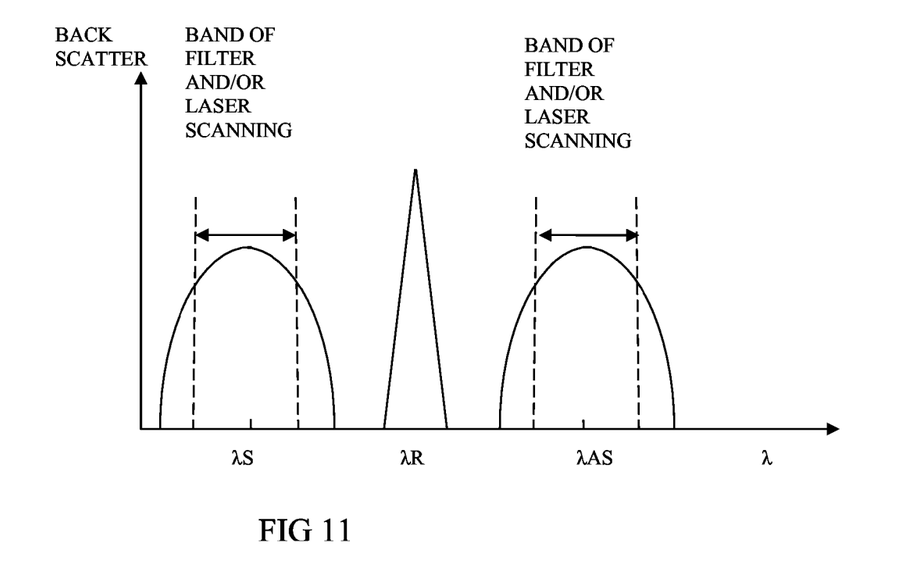
FIG. 11 shows a graph of backscatter v wavelength.

FIGS. 9-11 Fiber Calibration for Differential Loss

Another source of inaccuracy which can affect sensing measurements is differential loss. Differential loss arises since the anti-Stokes and Stokes components are in separate wavelength bands, so they suffer different transmission loss when returning to the detector and, therefore, the ratio of the anti-Stoke to Stokes varies as a function of distance along the fiber. This is usually referred to as "differential loss" error which results in a temperature sensing error along the fiber.

This has been found to be a greater problem for coated fibers. FIG. 9 shows an example of profiles of power on a log scale vs distance for Stokes and Anti Stokes components. Four profiles are shown, a Stokes and an Anti Stokes profile for non coated fibers, and a Stokes and an Anti stokes profile for a metallic coated fiber. The loss is more non linear with distance along the fiber for such coated fibers, and so it is harder or impossible to compensate for the loss by a linear factor, and instead a calibration profile with distance along the fiber needs to be used if sensing accuracy is to be maintained. This can be done pre installation, but as it is likely to change with time, with temperature and with installation damage, it is better carried out after installation and preferably is periodically or continuously updated between measurements.

A number of techniques have been described to compensate or correct for the differential loss error. One method is to use a multi-wavelength light source and measure the transmission loss of the fiber at Rayleigh, anti-Stokes and Stokes wavelength bands and correct for the differential loss along the fiber. This requires the additional expense and complexity of an additional light source covering the wavelength bands and multiple measurements for measuring the loss and the Stokes components.

Hence according to an embodiment of the invention, differential loss is measured using OTDR to determine loss at different locations along fiber using lasers of wavelength corresponding to Stokes and anti Stokes components and derive a profile of the differential loss along the fiber. As shown in FIG. 9, this is carried out using a differential loss tester 800. This can be part of the system or can be a stand alone device. It has laser pulse sources 860 controlled by a laser scan controller 870. The sources are coupled to the sensing fiber via a splitter 810, and send pulses down the fiber at wavelengths scanned across a band corresponding to a band of Stokes and a band of Anti Stokes backscatter according to a wavelength of pulses transmitted by the sensing system 100. The tester has band filters 820 matched to the bands of the laser sources. These can be implemented using conventional optical components. Following the band filtering, a receiver 830 receives the Rayleigh backscatter from the Stokes wavelength pulses, and a second receiver 835 receives the backscatter from the Anti stokes wavelength pulses. These receivers output a profile of scatter power vs time, which is are passed to integrators 840 and 845 to obtain a loss profile of loss vs distance. These profiles are now subtracted to obtain a differential loss profile vs distance which can be used by a receiver 104 of the sensing system 100 as a correction factor.

FIG. 11 shows a graph of backscatter vs wavelength, for pulses emitted by the sensing system. This shows three peaks, for the different components of the backscatter. The central peak is the Rayleigh component, at the same wavelength as the emitted pulses, in this case 1064 nm. On the right is the Anti Stokes component, at 1010 nm, but extending over a considerable band. On the left is the Stokes component, at 1110 nm. This also extends over a considerable band. The lasers of the tester are arranged to emit over a portion of the Stokes and the Anti Stokes bands. The larger the proportion of the band, the more accurate is the testing. The band filters should match the bands of the lasers to reduce noise in the signal processed and to improve accuracy.

FIGS. 12-18 Double Ended Operations

Another technique for overcoming non linear differential loss is to use double ended sensing measurements. This involves exciting the same optical fiber from both ends in a loop configuration and then taking the geometric mean of the anti-Stoke and Stoke ratio measured from both directions. This technique can mean additional equipment is needed such as a second receiver, or an optical fiber switch to allow measurement from both ends of the fiber to be fed to the same receiver chain, and in some cases it may be not technically practical or not commercially viable. For example, if the fiber is to be installed along narrow paths such as downhole oil wells or pipelines, it may be difficult to loop the fiber back along the same installation path. In addition the cost of the additional length of fiber may be not economical.

The size restriction of the loop back at the far end may be overcome to some extent by using a known U-bend component (known from AFL patent). This is formed by tapering a section of the fiber to a small diameter and then folding the fiber back on itself to form a small diameter (few millimetres) loop. However, this device relies on a light to remain guided by the high index difference between the glass and air interface and, therefore, requires a highly hermetic packaging solution. This restriction on the packaging of the device can also limit the conditions and the way the fiber may be deployed or installed. An example is in harsh environments in oil wells for example.

Figure 12:
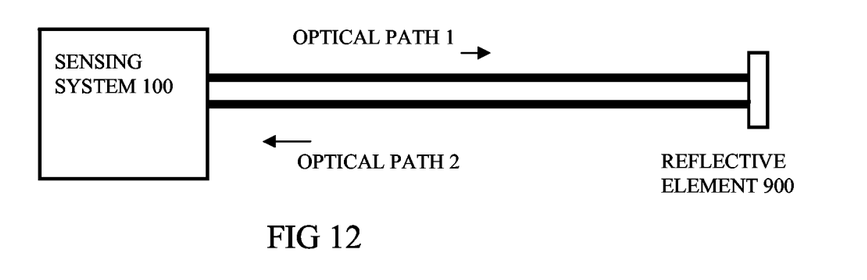
FIG. 12 shows a sensing system using a reflective element at a far end, according to an embodiment.

Accordingly another embodiment provides a reflective element at the far-end to allow light to be returned to the detector along a second optical path, the system being arranged to detect first scatter travelling towards the near end from any given point in the fiber, and to detect second scatter travelling towards the far end from the given point, and reflected back to the detector. FIG. 12 shows a sensing system coupled to two optical paths, to receive the first and the second scatter. A reflective element 900 is provided at the far end of the optical paths. The characteristics being sensed can be determined from the detected first and second scatter for a number of points along the fiber. This can be used instead of the tester described above, or the tester can be used for an initial accurate measurement of the profile during set up, and the double ended measurements can be used periodically during operation as a further check on how much the loss has changed.

Figure 13:
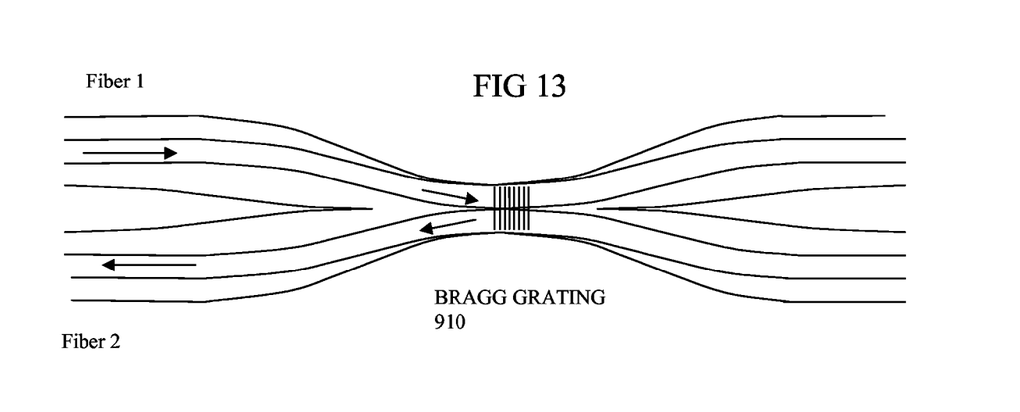
FIGS. 13, 14 and 15 show reflective elements according to embodiments.
Figure 14:
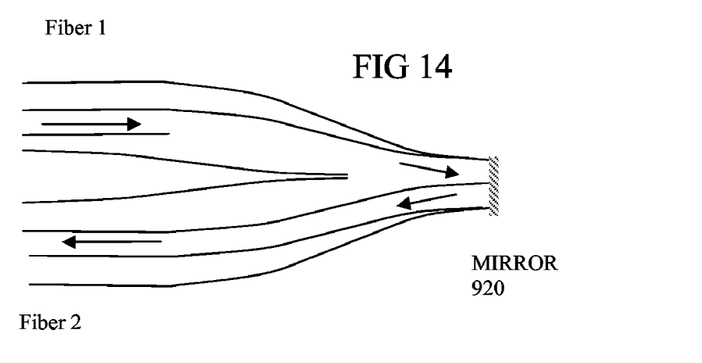

Use of a mirror at a far end of a sensing fiber has been described in the context of a system for generating a counter propagating pulse, to sense conditions from the non linear interactions of the reflected pulse with a forward travelling continuous wave. Another example is an optical fiber reflective coupler formed by fusing and tapering two fibers together and a reflective element is inserted in coupling section such that the light reflected back through the coupling section is coupled into a second optical path such as a second optical fiber. FIG. 13 shows an example using a Bragg grating 910 as the reflecting element. This can be formed by exposing the fiber to UV light to form a Bragg grating mirror. The reflective element may be inserted by cleaving the coupling section and then depositing a reflective metallic or dielectric coating at the end of the cleaved section. An example of this is shown in FIG. 14, including mirror 920.

This enables two separate fibers to be packaged along side each other and at the far end the light from one fiber to be coupled to the other fiber within the same overall dimension of the two fibers. The fused coupled section can be over jacked with a lower index glass capillary tube such as Vicor. The surface of the coupler can be coated with metallic or dielectric coatings to provide a more protective barrier to the surrounding environment.

In this case the light pulses are launched from the first fiber and the reflected and the scattered light components received through the same fiber are measured and analysed as the pulses propagate through the first fiber, reflected and coupled into the second fiber and then propagate through the second fiber. Then the light pulses are launched from the second fiber and the reflected and the scattered light components received through the same fiber are measured and analysed as the pulses propagate through the second fiber, reflected and coupled into the first fiber and then propagate through the first fiber. The two measurements can be combined to correct for the differential loss effect along the first and second fiber similar to double-ended measurement along the same fiber.

Figure 15:
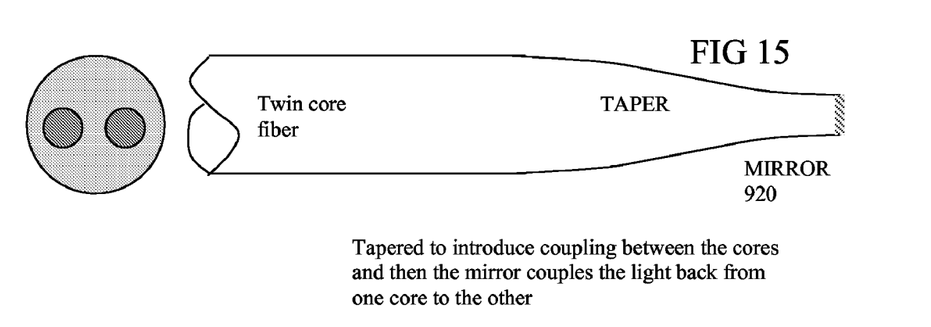

Another example shown in FIG. 15 shows a single fiber with multiple cores such as twin core fiber, used as the sensing fiber. The two optical paths are provided within the same fiber. In this case, the far end of the fiber can be fused tapered to bring the cores of the fiber closer together to introduce a strong mode coupling between the cores. A reflective element may be inserted in the coupling section to reflect the light back through the coupling section and couple the light across to the other cores.

Figure 16:
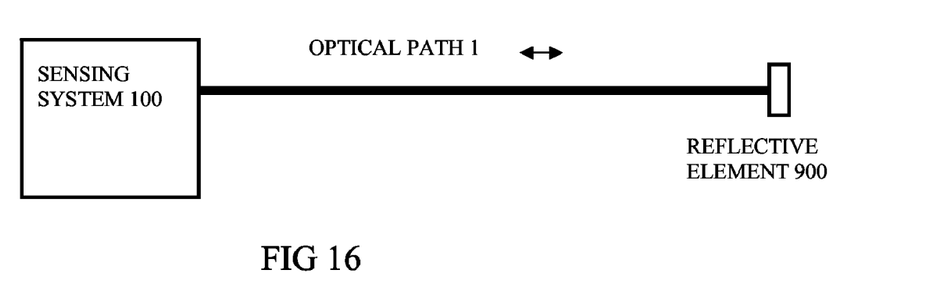
FIG. 16 shows an embodiment using a single fiber.

Another alternative is to provide a reflective element 900 where the light is reflected back on to the same optical path and propagates in the opposite direction. An example is shown in FIG. 16. In this case the first part of the reflected and scattered light trace when the light pulse propagates away from the launch end is compared to the second part of the reflected and scattered light trace, that is returning through the same fiber and herein referred to a ghost image, when the light pulse is reflected and propagate back toward the launch end. The first and second parts of the scattered light traces may be combined to calibrate the distributed characteristics of the fibre and inline components such as the refractive indexes, loss profiles and polarisation properties.

Figure 17:
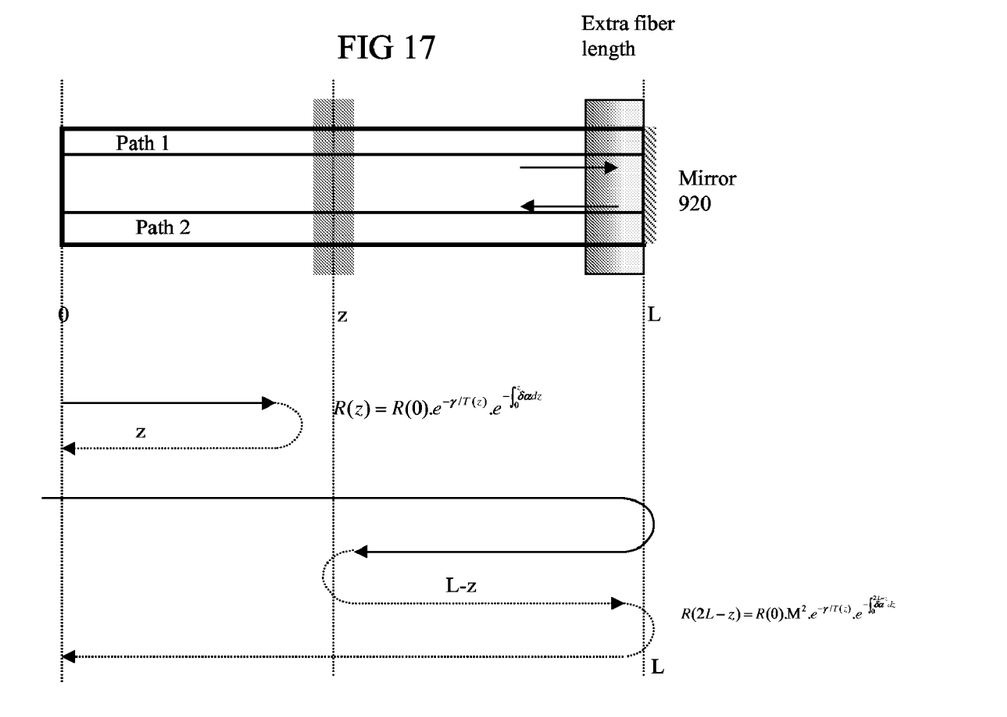
FIGS. 17 and 18 show schematic views of double ended sensing according to embodiments.
Figure 18:
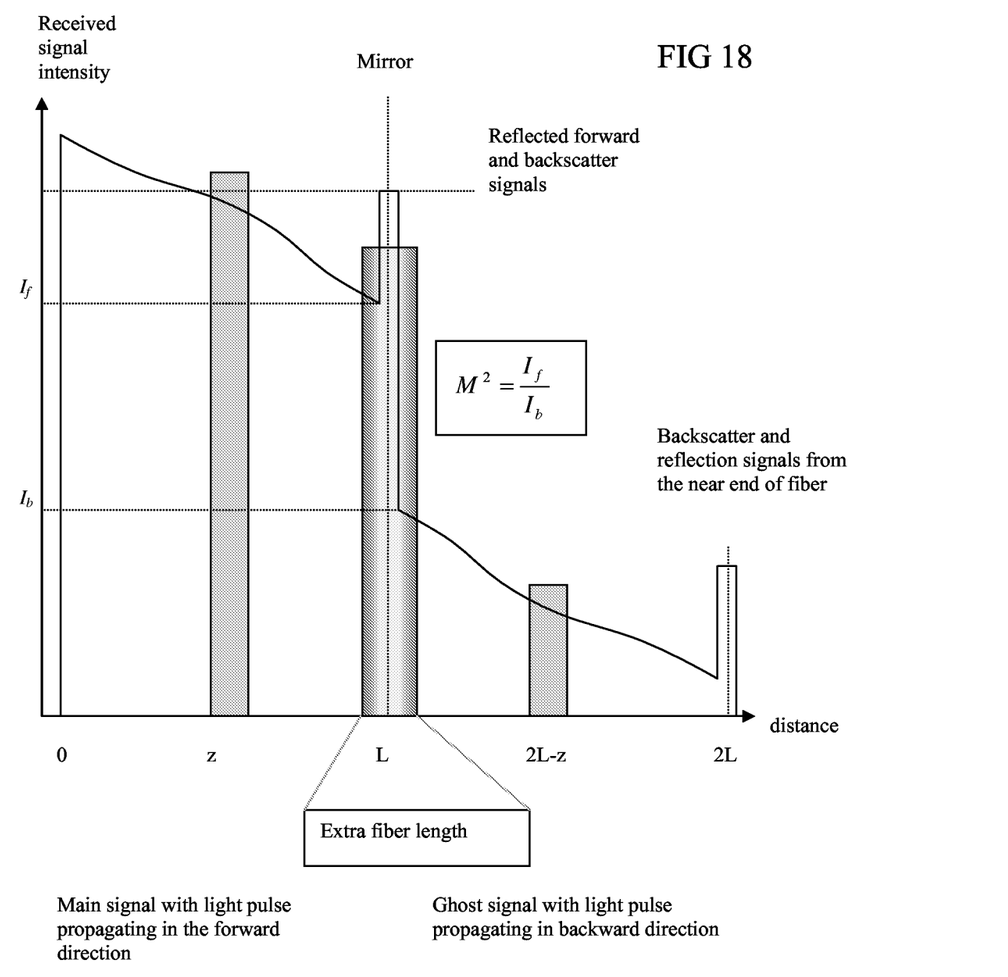

FIGS. 17 and 18 show in schematic form how such double ended sensing measurements are carried out, for either the two fiber or single fiber examples.

This feature may be used to correct for the differential loss effect in Raman distributed temperature sensor as described here. In FIG. 17, a first pulse travels a distance z, and after a further time the same pulse is reflected back and travels back to the same point. Hence from any given point there will be two backscatter instances. The first scatter is returned directly to the receiver. The second backscatter is returned to the mirror and thence reflected back to the receiver. It can be shown that the first normalised scattered trace, the anti-Stokes to Stokes ratio, may be represented as $$R(z) = R(0) \cdot e^{-\gamma/T(z)} \cdot e^{-\int_0^z \delta\alpha \, dz}$$

and the second normalised scattered trace may be represented as $$R(2L-z) = R(0) \cdot e^{-\gamma/T(z)} \cdot e^{-\int_0^{2L-z} \delta\alpha \, dz}$$

Taking the geometric mean of the two measurements we obtain $$R_{gm}^- = R^2(0) \cdot e^{-2\gamma/T(z)} \cdot e^{-\int_0^{2L} \delta\alpha \, dz}$$

However, by taking the ratio we obtain $$R_r^- = e^{-\int_0^{2L} \delta\alpha \cdot dz} \cdot e^{-\int_0^{2z} \delta\alpha \cdot dz}$$

From the above relationships and by knowing the temperature at least at one location we can find the integral loss and then the distributed differential loss.

FIG. 18 shows a graph of received signal intensity versus time. The left hand side shows the first scatter trace, then a peak in the response represents the arrival of the reflected pulse. This is so high a value that normally it is prevented by a time gate from reaching the receiver and saturating it. The extra fiber length is shown as a buffer region to allow a margin for the time gate. The right hand side shows a trace for the second scatter trace, also called the ghost trace.

CONCLUDING REMARKS

Some or all of the measures described can be combined to enable sensing at higher temperatures, for a given reach, a given accuracy, a given amount of repetition and averaging out of noise, and a given fiber lifetime, for a given cost of equipment, installation and operation. The trade off between these or other factors can be improved. Other variations within the claims can be conceived.

The invention claimed is:

1. A sensing system (100) comprising a sensing optical fiber, and a sensing system receiver (104) arranged to receive signals from the sensing optical fiber and determine conditions from the signals, and a fiber loss detector (800, 820, 830, 835, 840,845, 850, 860, 870) comprising lasers (860) for sending loss detection signals comprising a wavelength spectrum matching Stokes and anti Stokes components of the received sensing signals and the fiber loss detector also comprising one or more loss detecting receivers (830, 835) for receiving backscatter from the loss detection signals as they propagate along the sensing fiber, and comprising circuitry (840, 845, 850) for determining loss for different distances along the sensing fiber by optical time domain reflectometry (OTDR), and arranged to derive from the received backscatter signals a profile of differential loss along the sensing fiber.

2. The sensing system of claim 1, comprising a laser controller (870) arranged to scan the laser frequency to match the spectrum of the received components.

3. The sensing system of claim 1 comprising a band filter (820) arranged to filter the received components to match a spectrum of the laser.

4. A sensing system (100) for determining distributed differential loss of a fiber, the system comprising a transmitter arranged to transmit pulses of light along the fiber from a near end, a detector (104) to measure light scattered as the pulses travel along the fiber, and a reflective element (900, 910, 920) at the far-end to allow light to be returned to the detector along a second optical path, the system being arranged to detect first scatter travelling towards the near end from any given point in the fiber, and to detect second scatter travelling towards the far end from the given point, and reflected back to the detector, and comprising circuitry (104) arranged to determine the distributed differential loss from the detected first and second scatter for a number of points along the fiber; comprising a single fiber core, the transmitter using this fiber core for the pulses, and the second optical path using the same fiber core; the fiber comprising a cladding of diameter greater than 150μm and a metallic coating on the cladding.

5. A method of determining differential loss in a sensing system (100) comprising a sensing optical fiber, and a sensing system receiver (104) arranged to receive signals from the sensing optical fiber and determine conditions from the signals, the method comprising the steps of sending loss detection signals comprising a wavelength spectrum matching Stokes and anti Stokes components of the received sensing signals, receiving backscatter from the loss detection signals as they propagate along the sensing fiber, determining loss for different distances along the sensing fiber by optical time domain reflectometry (OTDR), and deriving from the received backscatter signals a profile of differential loss along the sensing fiber.

6. A method for determining distributed characteristics of a sensing fiber for a sensing system (100) comprising a transmitter arranged to transmit pulses of light along the fiber from a near end, a detector (104) to measure light scattered as the pulses travel along the fiber, and a reflective element (900, 910, 920) at the far-end to allow light to be returned to the detector along a second optical path, the method comprising the steps of detecting first scatter travelling towards the near end from any given point in the fiber, detecting second scatter travelling towards the far end from the given point, and reflected back to the detector, and determining the distributed characteristics from the detected first and second scatter for a number of points along the fiber.

\* \* \* \* \*